2,562,748

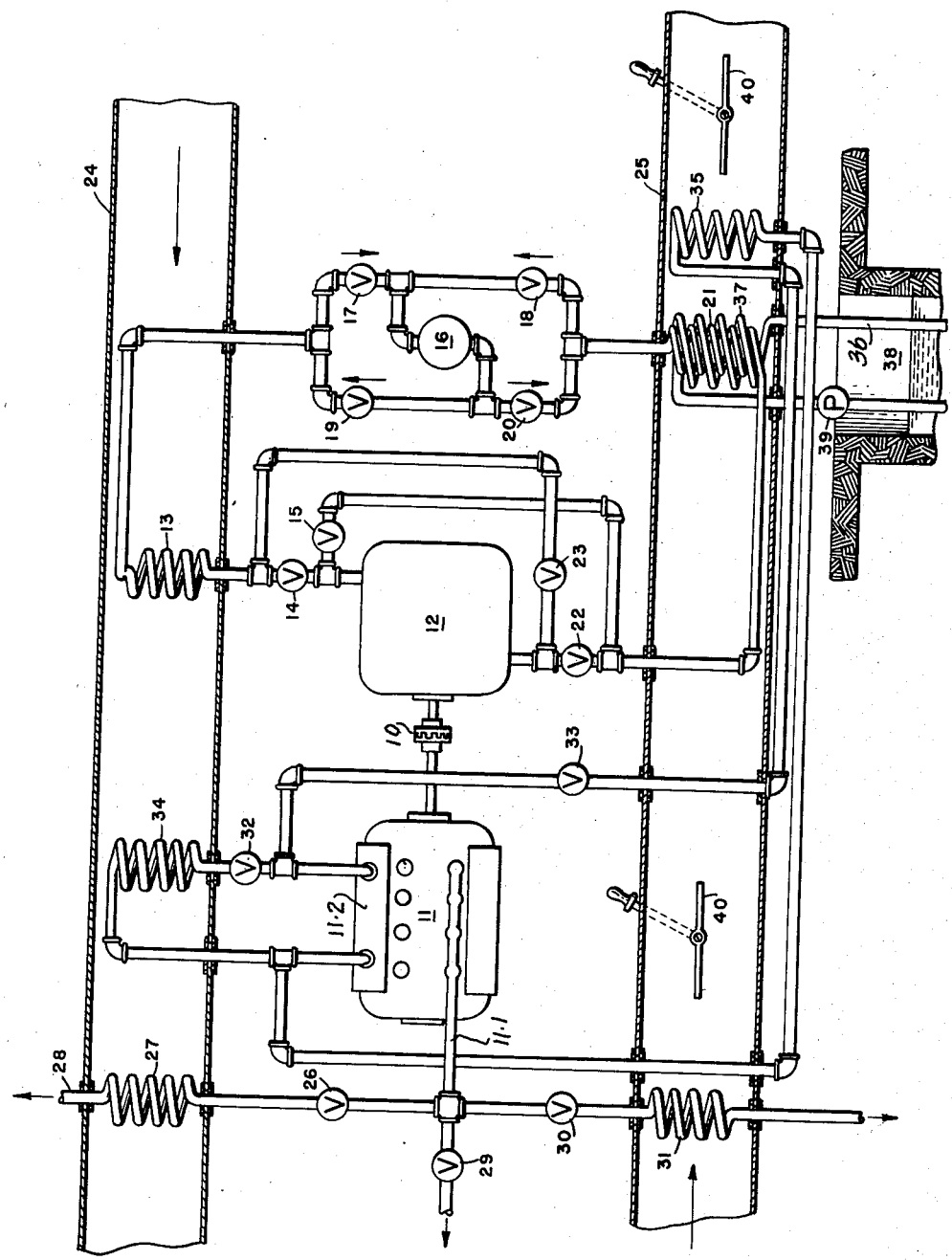
July 31, 1951     M. M. SMITH ET AL     2,562,748
HEAT PUMP
Filed Feb. 17, 1950
INVENTORS:
MARVIN M. SMITH
EMORY N. KEMLER
ATT'YS Patented July 31, 1951

UNITED STATES PATENT OFFICE 2,562,748

HEAT PUMP

Marvin M. Smith, Muncie, Ind., and Emory N. Kemler, Tarrytown, N. Y., assignors to Muncie Gear Works, Inc., Muncie, Ind., a corporation of Indiana Application February 17, 1950, Serial No. 144,608

1 Claim. (Cl. 257—9)

This invention relates to the use of the heat pump as a principal utility for space heating supplemented by heat derived from auxiliary equipment that utilizes fuel and furnishes power for operating the heat pump; and further, relates to means for increasing the efficiency of utilization of fuels for heating and cooling purposes through the employment of a heat pump operating on a reversed refrigeration cycle.

The main objects of this invention are to provide heat pump apparatus of sufficient flexibility to accommodate its operation to a wide range of natural temperature changes with a high average of mechanical efficiency; to provide improved means for operating the refrigerant cycle of a heat pump by a prime mover supplying auxiliary heat derived from combustion of fuel with such selective cooperation of different heat sources as to attain increased overall efficiency; and to provide an improved construction of such heat pump whereby heat may be selectively taken from different sources according to the current availability of such sources to meet particular requirements as regards space heating and cooling.

A specific embodiment of this invention is illustrated diagrammatically in the accompanying drawing, in which:

The figure is a schematic view of a heat pump comprising a refrigeration cycle apparatus and an internal combustion engine coacting to condition air for heating and cooling purposes.

In the utilization of fuels—such as fuel oil and gas for example—in furnaces such as are employed in homes, industrial and commercial establishments, the normal efficiency is generally less than 70%. When the fuel is employed in a power plant, such as an internal combustion engine, approximately 30%—by way of example—of the energy of the fuel will be converted to work utilizable in connection with the operation of the compressor of a heat pump. The other 70% of the energy will be discharged from the exhaust at a temperature comparable with that which exists in a house heating furnace and can in an appropriate arrangement of heat exchangers be utilized in conjunction with a heat pump to provide a very effective heating plant. This same general comment applies particularly to internal combustion engines, gas turbines, coal or oil burning turbines, and other engines that take their power from products of combustion.

If we assume that heat is being pumped from 20° F. to 100° F. by a heat pump to heat the air in a duct, the theoretical coefficient of performance will be $$\frac{100+460}{100-20}=7$$

If then it be assumed that one-quarter of the heat is supplied by the waste heat of the engine from the exhaust or cooling system, or both, the heat pump would supposedly only need to pump the heat from perhaps 20° F. to 80° F. The theoretic coefficient of performance would now be $$\frac{460+80}{80-20}=9$$

The degree to which this improved performance can be utilized will, of course, be dependent upon the type of heating to be done and the ratio that the heat recovery from the engine bears to the work done.

Further advantages of such a system inuring to the improved operation of the heat pump reside in the availability of such recovered heat for defrost control.

In the schematic representation of the present invention, as illustrated in the drawing, an engine 11 drives a refrigeration compressor 12 of a heat pump. When operating on the heating cycle, the compressor 12 discharges to the heat exchanger 13, the valve 14 in the discharge line being open and the valve 15 being closed. The refrigerant vapor at high temperature and pressure is condensed in the heat exchanger 13 and passes to the receiver 16 through the check valve 17.

Check valve 18 prevents flow around the receiver and expansion valve 19 acts as a check valve to prevent by-passing the receiver 16. As the temperature or the pressure in the heat exchanger 21 requires, combined expansion and check valve 20 opens and allows liquid refrigerant to pass to the heat exchange unit 21, which thus functions as the evaporator element of the heat pump. On the heating cycle, valve 22 is open to permit vapor to enter the suction side of the compressor 12 and valve 23 is closed to keep the high pressure gas from entering the suction side.

The heat for the heat pump, as here indicated, is obtained from a source of heat that is in heat exchange relation with the heat exchange unit 21 when this unit acts as an evaporator. A duct 24 is provided to carry the air that is to be conditioned in heat-exchange relation to the heat exchange unit 13. In the form shown, the heat exchange unit 21 is located in an air duct 25 which serves to bring to it a current of air when such air is the source of heat for the heat pump.

When it is desired to cool the air in duct 24 for delivery to the conditioned air space, the path of the refrigerant vapor is reversed by closing the valves 14 and 22 and opening valves 15 and 23. The path of the refrigerant is now from compressor 12 through valve 15 to heat exchanger 21, then through check valve 18 to receiver 16, then through expansion valve 19 to heat exchanger 13 and through valve 23 to the suction line of compressor 12.

In order to utilize the waste heat of the engine 11 its exhaust pipe 11.1 is divided into three branches. One branch, controlled by valve 26, leads through a heat exchange unit 27 in the air duct 24 and discharges at 28. A second branch controlled by valve 30 leads through heat exchange unit 31 located in heat exchange relation to the contents of duct 25 and a third branch, controlled by valve 29, discharges the exhaust to the atmosphere.

Similarly, the liquid cooling medium that circulates through the engine jacket 11.2 may be directed by valve 32 through heat exchange unit 34 in air duct 24 or may be directed by valve 33 to heat exchange unit 35 which is located in heat exchange relation to the air duct 25 in position to serve as a defrosting unit for the heat exchange unit 21.

In the form shown, a heat exchange unit 37 is mounted in heat exchange relation to the heat exchange unit 21 and forms part of a conduit 36 for water from a well 38 or other source that is subject to earth temperature. Circulation in this conduit is provided by means of pump 39.

Dampers 40 in the duct 25 permit the same to be closed against air flow at times when the heat exchange unit 37 is serving as a source of heat during the heating cycle or as a dump for heat during the cooling cycle.

When operating under normal conditions on the heating cycle, exhaust from the engine will pass through valve 26 to heat exchanger 28 where, after supplying additional heat to the air in the duct 24, it will pass to exhaust at 28. When the exhaust is directed in this manner, the valves 29 and 30 will be closed. When operating on the cooling cycle, valve 29 would normally be open, letting the engine exhaust to the atmosphere and the valves 26 and 30 would be closed.

When frost problems are encountered in the air duct 25, the engine exhaust is allowed to pass through valve 30 to the heat exchanger 31 and then to exhaust. The heat added to the outside air entering the duct 24 would offset certain ranges of frost conditions and be sufficient to prevent frost formation.

In most localities frost deposits on the evaporator coils of a heat pump taking its heat from the air are most severe at outside air temperatures slightly above freezing, 35° to 40° F. being the range during which most trouble occurs. Conditions for frost formation are most severe when the dew point for the air is at or below freezing.

Since the heat pump in taking heat from the air reduces its temperature only a few degrees, it can be seen that the air must have a relatively high humidity if frost is to form. Air at very low outside temperatures usually has a very low relative humidity; hence frost formation under these conditions is not serious.

At the critical conditions, the equipment shown in the drawing can be set to have the exhaust shift to coil 31 and have the entering outside air increased in temperature to the point where frost will no longer form.

When the humidity conditions under which frost forms are no longer encountered, valves 29 and 30 would be closed and valve 26 would be open so as to shift the exhaust back to coil 27 to be used for heating. The water used in the cooling system of the engine would pass through valve 32 to heat exchanger 34 where the heat normally dissipated by the cooling water would be recovered in duct 24.

When the heat pump is operating on the cooling cycle, valve 32 would be closed and valve 33 would be open to circulate the cooling water to the heat exchanger 35 where its waste heat would be carried off by the air in the duct 25, or by the water in heat exchange unit 37.

It is also possible to use the exhaust of the engine for frost removal by stopping the compressor by opening clutch 10 and letting the engine run idle so that the heat of the exhaust would change the temperature in duct 25 sufficiently to melt the ice in a short period of time, while the heat pump is at rest.

When operating on the cooling cycle, the humidity can be reduced by means of coil 13. In some conditions this results in too low a delivery temperature and reheating of the air in duct 24 becomes necessary. This can be taken care of by putting either heat exchanger 27 or 34 into use in duct 24, while heat exchanger 13 is being used for cooling.

Although but one specific embodiment of this invention is herein shown and described, it will be understood that numerous details of the structure shown may be altered or omitted without departing from the spirit of the invention as defined by the following claim:

We claim:

An air conditioning system, comprising a pair of air ducts; an internal combustion engine, having a water jacket and an exhaust pipe; a refrigerant cycle apparatus having a compressor and a pair of heat exchange units connected in condenser and evaporator relation to said compressor and respectively located in heat exchange relation to different said air ducts; a pair of heat exchange units communicating separately with said water jacket and located respectively in heat exchange relation to different said air ducts; a pair of heat exchange units communicating separately with said exhaust pipe and located respectively in heat exchange relation to different said air ducts; and valves controlling said heat exchange units selectively.

MARVIN M. SMITH.
EMORY N. KEMLER.

REFERENCES CITED

The following references are of record in the file of this patent:

UNITED STATES PATENTS

| Number | Name | Date |
|---|---|---|
| 1,969,187 | Schutt | Aug. 7, 1934 |
| 2,096,967 | Johnson | Oct. 26, 1937 |
| 2,266,238 | Newton | Dec. 16, 1941 |
| 2,309,165 | Candor | Jan. 26, 1943 |
| 2,313,439 | Horton | Mar. 9, 1943 |
| 2,461,449 | Smith | Feb. 8, 1949 |
| 2,468,626 | Graham | Apr. 26, 1949 |
| 2,513,373 | Sporn | July 4, 1950 |